United States Patent [19]

Schroeder et al.

[11] 4,431,675

[45] Feb. 14, 1984

[54] HARD SOLID ANIMAL FEED SUPPLEMENT

[76] Inventors: Jack J. Schroeder, No. 4 Quail Ridge Rd. North, Rolling Hills, Calif. 90274; John E. Findley, 8828 Jaylee Dr., San Gabriel, Calif. 91775

[21] Appl. No.: 441,549

[22] Filed: Nov. 15, 1982

Related U.S. Application Data

[63] Continuation of Ser. No. 241,465, Mar. 6, 1981, abandoned.

[51] Int. Cl.$^3$ .......................... A23K 1/02; A23K 1/20; A23K 1/22

[52] U.S. Cl. .......................................... 426/69; 426/74; 426/623; 426/630; 426/635; 426/658; 426/807

[58] Field of Search .................... 426/69, 74, 623, 630, 426/635, 658, 807

[56] References Cited

U.S. PATENT DOCUMENTS

| | | | |
|---|---|---|---|
| 4,027,043 | 5/1977 | Schroeder et al. | 426/69 |
| 4,062,988 | 12/1977 | DeSantis et al. | 426/69 X |
| 4,160,041 | 7/1979 | Schroeder et al. | 426/658 X |
| 4,171,385 | 10/1979 | Skoch et al. | 426/69 X |
| 4,171,386 | 10/1979 | Skoch et al. | 426/69 X |
| 4,221,818 | 9/1980 | Schroeder | 426/658 X |
| 4,234,608 | 11/1980 | Linehan | 426/635 X |
| 4,265,916 | 5/1981 | Skoch et al. | 426/630 X |

FOREIGN PATENT DOCUMENTS 2000791  5/1973  Fed. Rep. of Germany ...... 426/658

*Primary Examiner*—Joseph M. Golian
*Attorney, Agent, or Firm*—Fischer, Tachner & Strauss

[57] ABSTRACT

The invention is a sugar solution-based, preferably molasses-based, animal feed supplement which is produced as a viscous liquid that is gelled into a hard solid by the addition of a soluble calcium salt or oxide, preferably calcium oxide, a soluble phosphate, and a substantial quantity of magnesium oxide. Prior to its solidification a limited amount of discrete cellulose fibers can also be added to reinforce the solid and prevent its cracking. The solid product is hard and water resistant and has a limited consumption rate.

21 Claims, No Drawings

HARD SOLID ANIMAL FEED SUPPLEMENT

This application is a continuation of application Ser. No. 241,465 filed Mar. 6, 1981, now abandoned.

BACKGROUND OF THE INVENTION

1. Field of Invention

This invention relates to an animal feed supplement and, in particular, to a solid animal feed supplement.

2. Brief Statement of the Prior Art

Molasses has been used for many years as an animal feed supplement together with additives such as phosphoric acid and feed nutrients such as urea, fats, and the like. Solid materials such as cottonseed meal have also been suspended in the molasses; however, difficulties have been experienced with maintaining a stable suspension of solid materials. The liquid materials have been fed by application to fodder or by free choice feeding on lick-wheels.

Recently, attempts have been made to provide the supplements in solid form, thereby permitting free choice feeding by the animals and reducing the labor and expense in feeding the supplement. Some blocks have been manufactured by compressing the ingredients into a molded shape or by evaporative heating of the molasses to crystallize the sugars. It has also been proposed to add relatively high amounts of calcium or magnesium hydroxide to molasses to prepare a solid feed block; see British Pat. No. 1,356,954 of June 19, 1974. A recently patented technique provides a far more flexible solidification technique which avoids the difficulties and expenses of the aforementioned methods by the addition of a soluble phosphate and, preferably, calcium oxide or a soluble calcium salt to molasses to convert the molasses into a gelled solid; see U.S. Pat. Nos. 4,027,043, and 4,160,041. The methods and products disclosed in the aforementioned patents have been used commercially by packaging of the product in cardboard cartons.

These products are intended for free choice or managed feeding. Unfortunately, in some free choice feeding situations, animals tend to overconsume the highly palatable molasses blocks and appetite suppressants such as salt are often necessary ingredients. U.S. Pat. No. 4,221,818 discloses a novel solution; corrugated cardboard dividers are embedded in the solid to obstruct the feeding efforts of the animals.

Magnesium oxides have been included in feed supplements such as described in U.S. Pat. Nos. 4,171,385 and 4,171,386 and in New Zealand Patent Specification No. 170,505 published Aug. 14, 1974. Magnesium is a desirable ingredient since it is effective in prevention of grass tetany and acidosis and has been found to increase milk production of dairy cattle when fed at appropriate levels. While the aforesaid patents disclose that high contents of magnesium oxide solidify molasses into lick blocks, it has been found that the solidification is slow and that the blocks which are formed are often too soft to limit their consumption and thus may require an additional appetite suppressant.

BRIEF STATEMENT OF THE INVENTION

This invention comprises a solid animal feed supplement in block form which is sufficiently hard and water resistant to limit its consumption during free choice feeding of animals. The hardness required for ths consumption inhibition is achieved by the combined addition of soluble calcium and phosphate reactants and a substantial quantity of finely subdivided magnesium oxide. Discrete cellulose fibers can also be added at low concentrations to reinforce the feed block and prevent its cracking during normal storage and handling.

The animal feed supplement to which these ingredients are added comprises an aqueous sugar solution, preferably molasses. The sugar solution is solidified by the addition thereto of a soluble phosphate or phosphoric acid and calcium oxide or soluble calcium salt in amounts from 0.5 to about 5 weight percent of each sufficient to cause solidification. Finely subdivided magnesium oxide is also added to the sugar solution at a concentration from 2 to 15 weight percent of the final product.

DESCRIPTION OF THE INVENTION

The feed supplements which are used for practice of this invention in general have the composition set forth in the following table:

TABLE 1

| Ingredient | Proportions, Weight Percent | |
|---|---|---|
| | Broad | Preferred |
| Sugar solution | 45–95 | 55–80 |
| Phosphorus | 1–10 | 1–5 |
| Calcium* | 1–8 | 1–4 |
| Magnesium* | 1–15 | 2–10 |
| Protein** | 0–40 | 12–40 |
| Fat | 0–30 | 0–20 |
| Vitamins | 0–3 | 0.1–2 |
| Minerals | 0–40 | 0.1–2 |
| Cellulose*** | 0–2.5 | 0.1–1.0 |

*Expressed as oxides.
**Expressed as weight percent of equivalent protein.
***Added as required to inhibit cracking.

The content of minerals, phosphorus and calcium, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent phosphorus, 5 to 8 percent calcium and from 0.1 to 2 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as monensin and sodium monensin, commercially available under the designation Rumensin from Eli Lilly Co.; chlorotetracyline and sulfamethiazine; and mixtures of chlorotetracyline and sulfamethiazine; etc. Other useful drugs include antibloat and antihelmintic agents as well as insect control agents. The aforementioned materials are used in effective concentrations for the desired result, e.g., drugs are used at concentrations from 0.5 to about 1.0 weight percent. The minerals are usually used in similar concentrations, but are often expressed in amounts from 3 to about 500 milligrams per pound and vitamins are frequently expressed from 10 to about 50,000 units per pound.

THE SUGAR SOLUTION

The animal feed supplement is prepared from an aqueous sugar solution. A variety of sugar solutions can be used; however, molasses is a preferred source. The sugar solution should be present in the feed supplement at a concentration of from 45 to about 95, preferably from 55 to about 80, weight percent. The preferred molasses source is a commercially available sugar solution content from about 60 to 85 Brix and a consistency that varies from a thin to a thick syrup. The water content of these solutions is from 5 to about 30 weight percent. The molasses can be any sugar containing molasses such as cane or Blackstrap Molasses, beet molasses, converted molasses, wood sugar molasses, hydrosyrup, citrus molasses, and the like.

Another sugar solution that can be used is whey, a byproduct of the dairy industry. The whey is a dilute solution of lactoalbumin, lactose, some fats, and the soluble inorganics from the parent milk. This whey solution is condensed and spray dried to a powder or is condensed to about 40 to 60 percent solids and preserved. A typical analysis is as follows:

TABLE 2

| Composition of a Typical Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:
Ammonium lignin sulfonate;
Sodium lignin sulfonate; and
Magnesium lignin sulfonate.

A typical analysis of a commercially available ammonium lignin sulfonate solution is as follows:

TABLE 3

| Typical Analysis of Ammonium Lignin Sulfonate | |
|---|---|
| Percent solids | 50% |
| Specific gravity | 1.237 |
| pH, 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is the energy source ingredient of the supplement. Sources of other metabolizable organic values can be used to replace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive. These materials can have from 40 to 100 percent solids and contain, on a dry weight basis, from 2 to 15 percent sugar. From 5 to 90 percent of the aforementioned sugar solutions can be replaced with these molasses solubles, depending on the sugar content of the solubles; the higher content sugar materials being useful to replace the higher proportion of the sugar solution.

THE PHOSPHATE INGREDIENT

The phosphate which is employed as a solidifying component in the feed supplement can be any suitable feed-grade water soluble phosphate or phosphoric acid. Useful acids include electric furnace (white) phosphoric acid, or defluorinated wet-process (green) phosphoric acid, which can be of any commercially available grade such as the commonly available concentration range of from 50 to about 55 weight percent expressed as $P_2O_5$ corresponding to a concentration of orthophosphoric acid of about 70 weight percent. The phosphate source is employed in the sugar solution at a concentration from about 1.0 to about 6.0, preferably from 1.0 to about 5.0 weight percent, expressed as $P_2O_5$.

THE CALCIUM INGREDIENT

The other solidifying component of the composition is calcium oxide or hydroxide. Commercially available lime, calcium oxide, is useful in finely subdivided form, typically 90 weight percent or more passing a 125 mesh screen. The more finely subdivided the lime, the faster that it will hydrate and participate in the solidification of the supplement. The lime can be slaked by mixing with water prior to addition to the sugar solution, or if desired, can be added directly to the aqueous sugar solution, depending on the process equipment and controls. The amount of the calcium oxide or hydroxide ingredient which is employed can be from 1.0 to about 5.0 weight percent, expressed as the oxide, and preferably is from about 1.0 to about 3.0 weight percent, based on the weight of the sugar solution. The proportions of the calcium oxide or hydroxide to the phosphate component can be such that the reactant mixture preferably has an acidic pH value, typically from 3 to about 6.5 and most preferably from about 3.5 to about 6 after addition of the phosphate and calcium ingredients. The acidic pH can be obtained by an amount of the phosphate component which is greater than its stoichiometric proportion to the metal salt or oxide or by the addition of another acidic ingredient such as sulfuric acid, acetic acid, etc. The proportions of these ingredients can conveniently be expressed as a ratio of equivalent weights of phosphate to the metal from 1 to about 4.

The calcium oxide can be present in quantities in excess of the aforementioned proportions to the phosphate; in such instances, the excess metal is unreacted and is incorporated as a feed ingredient. This is useful to provide a substantial quantity of calcium in the final product for applications such as a feed supplement for dairy cattle. Concentrations up to about 10 weight percent of the metal, expressed as the oxide can be used.

The solid feed supplement which is formed from the compositions has a tendency to become soft as the equivalent weights ratio of the phosphate to the metal is reduced substantially below about 1.0. Greater concentrations of phosphoric acid can be employed, raising the ratio of phosphate to metal above 4, if very low, acidic pH values are desired. Alternatively, another acid such as a mineral acid; e.g., sulfuric acid, or acetic acid can be added in the amount needed to adjust the pH to the desired value. It is believed that the soluble phosphate and added metal source; e.g., calcium oxide, function by at least partial reaction to form a metal phosphate. The exact nature and extent of the reaction is not presently known and these ingredients are, therefore, described herein as additives, recognizing that during the preparation of the product there may be a reaction product formed by a partial neutralization of the phosphoric acid or by a metathesis reaction between soluble phosphates and metal salts.

THE MAGNESIUM OXIDE INGREDIENT

The hardness of the block desirable to achieve the consumption inhibition during free choice feeding is obtained by the addition of finely subdivided magnesium oxide in an amount from 2 to about 15 weight percent, preferably from 2 to about 10 weight percent, to the supplement. This quantity of magnesium is also beneficial in prevention of grass tetany and acidosis and for increasing milk production of dairy cattle. The magnesium oxide should be finely subdivided, at least 90 weight percent passing a 100 mesh screen, preferably all passing a 325 mesh screen.

The manner in which the magnesium oxide increases the hardness of the calcium-phosphate-molasses block is not entirely understood. It is believed that a substantial amount of the magnesium oxide hydrates since the pH of the final product is alkaline, typically from 8 to about 10.5. This hydration reduces the free water of the sugar solution, thereby rendering the calcium-phosphate reactants more effective in solidification of the supplement. It is also possible that the resulting magnesium hydroxide reacts with the sucrose of the sugar solution, forming insoluble magnesium saccharate in a qunatity sufficient to increase the hardness of the product.

THE PROTEIN INGREDIENT

When the feed supplement is intended for consumption by ruminants, a non-protein nitrogen compound such as ammoniacal compounds; e.g., urea, biuret, or mono- or di-ammonium phosphate can be added to supply the protein nitrogen dietary requirements of the animals. The preferred material for a nitrogen source is urea which can be added in an amount from 2 to about 15 weight percent, preferably from about 3.0 to about 12 weight percent, based on the feed supplement.

Generally, the feed supplement should not contain more than about 40 weight percent equivalent protein content from a protein or non-protein nitrogen compound and the aforeindicated upper limit for the concentration of urea in the supplement corresponds to this maximum equivalent protein content. When molasses is used as a sugar source, the maximum amount of urea can be reduced by the amount of equivalent protein contributed by the molasses (about 1 to 15 weight percent) to the preferred, maximum 12 weight percent limit based on the feed supplement. A typical ruminant feed would, therefore, contain from 2 to about 15, preferably from 3 to about 12 weight percent urea as a source of non-protein nitrogen.

Other protein sources are animal wastes such as dried and sterilized poultry waste and the dried and sterilized by product effluents from fermentation of cattle manure.

Cereal products and by-products of the cereal industry can also be used as a protein source. Meals, which are finely ground grains such as cottonseed meal, soybean meal, etc., can be added as a source of protein to provide the aforementioned protein content of the supplement. Another suitable source of protein is condensed fermented corn extractives (corn steep liquor) which is obtained from wet milling of corn and which contains the proteins occuring in corn.

THE FAT INGREDIENT

Fats and oils can also be added to the solution before it solidifies. Suitable fats and oils are feed grade water insoluble fats and oils from animal and vegetable sources which can be liquids or solids at room temperature. The supplement can contain up to about 30 weight percent fat, preferably from 5 to about 20 weight percent feed grade fat. These fats are various fatty acids such as stearic, palmitic, oleic, linoleic, lauric, etc., and the mono-, di-, or tri-glycerides of these fatty acids. Useful fats and oils can also include complex lipids such as the phospholipids; e.g. fatty acid esters of glycerol phosphate or lecithins, which also contain nitrogen bases such as choline. The fats are commonly identified by source and suitable fats which can be employed include the oils, tailings, or residues of the following: soybean oil, cottonseed oil, sesame oil, olive oil, corn oil, tallow, fish oil, coconut oil, palm oil, etc. Preferably, relatively inexpensive sources of fats are employed, such as the yellow grease compositions which are reclaimed restaurant fats and greases, acidulated soap stocks, or acidulated fats and oils. The fat ingredient can also contain an antioxidant in an effective amount to inhibit oxidative degradation of the fat; e.g., from 0.01 to about 1 weight percent butylated hydroxyanisole, butylated hydroxytoluene, 4-hydroxymethyl-2, 6-di-tert butylphenol, etc.

A fat emulsifying agent can also be added with the fat, and for this purpose any suitable cationic, anionic, or nonionic surfactant can be employed. Examples of cationic surfactants include fatty amines, fatty amides, quaternary anionic surfactants include the fatty acid glyceride sulfonates and fatty acid sulfonates, such as sulfonated cottonseed oil, sulfonated sperm oil, sulfonated tallow, sulfonated aromatic hydrocarbons; e.g., benzene sulfonic acid, etc. Useful nonionic compounds include polyethylene oxide condensates of hydrophobic groups having a reactive hydrogen with from 10 to about 25 carbons condensed with from 2 to about 15 molecular weights of ethylene oxide. Examples of such materials include polyoxyethylene condensate with alkyl or alkenyl phenols, alkyl or alkenyl alcohols, long chain alkyl or alkenyl amines or amides, fatty acid partial esters of hexitans, etc. Free fatty acids and phospholipids which are present in some fat sources also function as emulsifying agents and no added emulsifying agent may be required with such fat sources.

The amount of the emulsifying agent employed for stabilizing the composition and preventing the separation of the fat ingredient during manufacture of the product or weeping of the fat ingredient from the solid after its formation can be from about 0.05 to about 1 weight percent.

Other emulsifying and solidifying components which can be used include the gums, whether artificial or natural. Thus, the various cellulose derivatives such as carboxymethylcellulose and alkali metal salts; e.g., sodium salt, hydroxyethylcellulose, hydroxpropylmethylcellulose, etc., the various alignates and their derivatives such as sodium alignate, propylene glycol alignate, etc., can be used. In addition, such natural gums such as gum tricgacin, xanthan gum, locust bean gum, etc., may be used.

THE CELLULOSE FIBER INGREDIENT

The cellulose fibers which can be used as reinforcement for the solid block products are discrete fibers which will readily disperse into the liquid feed supplement before it is gelled into a solid. Wood and paper pulp are excellent sources of suitable cellulose fibers. Useful materials can include paper pulp from repulped waste paper, however, some purification of this crude product may be necessary to remove potentially objectionable or hazardous impurities from paper sizing additives, printing inks and the like. A preferred source of discrete cellulose fibers is unbleached Kraft process wood pulp which comprises decomposed wood fibers of lengths from about 1/16 to ½ inch, usually about 174 inch. These fibers are available in sheets formed by pressing and dehydrating the pulp. The sheets can be readily formed into fragments which will quickly disperse into discrete fibers when mixed into an aqueous liquid such as the sugar solutions.

Other useful sources of cellulose fibers include the various pulp products of the pulp and paper industry. These include: dissolving and special alpha grades, sulfite paper grades, sulfate paper grades, soda pulp, groundwood pulp, and semichemical pulp. These sources are named after the manufacturing process by which the are prepared. Sulfite, sulfate (Kraft) and soda pulps are derived by chemical treatment of wood to solubilize and remove lignins with, respectively, sulfurous acid, sodium hydroxide and sulfide, and sodium hydroxide, alone. Groundwood pulp is produced by mechanical pulping of wood and semichemical pulp is prepared by chemically pretreating wood chips before mechanical pulping.

Unbleached wood pulp is preferred since there is no necessity to refine the pulp by bleaching, which is commonly used for paper stocks, to remove residual quantities of lignins and colored degradation products. The bleached pulp will, however, function entirely satisfactorily and may be used if its greater cost is not objectionable.

Other pulp sources include pulp prepared from nonwood raw materials such as cotton, linen, manila, cotton linters, hemp, flax, jute, beet, cereal straws, bamboo, esparto and bagasse. These raw materials, however, require processing and purification to obtain a suitable source of cellulose pulp that will provide discrete cellulose fibers which can be readily dispersed into the sugar solutions. Pulps from these sources are not readily available in countries having a healthy forest industry, such as the United States, and are therefore less preferred sources of cellulose fibers for use in the invention.

The aforementioned pulps are usually available as "market pulp" in the form of large bales or as pressed and partially dehydrated sheets and either form is suited for use in the invention.

THE PREPARATION METHOD

The solid supplement can be prepared by admixing its liquid ingredients together and thereafter adding its dry ingredients individually or as a dry blended premix, stirring the mixture to disperse the dry ingredients and then adding the fat ingredient if used.

The preferred procedure is to admix the calcium oxide or hydroxide with the aqueous sugar solution and permit a sufficient time, e.g., from 5 to about 20 minutes for thorough mixing of these ingredients. The calcium oxide can be hydrated before its addition to the sugar solution, or can be added directly to the sugar solution and permitted to hydrate with the water in the sugar solution. In either technique, the resultant mixture becomes heated from an exothermic reaction and a partial reaction between the calcium hydroxide and sugar solution possibly occurs.

The phosphoric acid is preferably added next, reducing the pH of the mixture to a value from about 3.5 to 6.5. Again, heat is evolved presumably from a reaction between calcium heat is evolved presumably from a reaction between calcium hydroxide and phosphoric acid. As soon as the phosphoric acid has been admixed in the mixture (about 2 to 10 minutes) the finely subdivided magnesium oxide is added and dispersed throughout the mixture. Again, heat will be evolved and the temperature of the mixture typically reaches 100 to about 150 degrees F. and it can be packaged at these temperatures.

The various optional ingredients can be added at any time during the addition of these solidification and hardening ingredients. Preferably, the protein additive and/or the fat is added last, shortly prior to solidification of the mixture. The emulsifier for the fat ingredient can be incorporated in the mixture prior to or during the addition of the fat. The dry ingredients for the supplement can be dispersed in the liquid sugar solution by stirring for a period of from 2 to about 50 minutes. The composition will start to thicken within 20 to 30 minutes after the last of the solidifying ingredients has been added to the liquid.

The cellulose fibers can be added at any time during preparation of the supplement and prior to its solidification. Preferably, the cellulose fibers are added to the aqueous sugar solution and the mixture is stirred to disperse the fibers. The solid, consolidated sheets of the fibers immediately disperse into individual short lengths of fibers upon addition to the aqueous sugar solution and can be distributed throughout the solution with mild agitation.

Prior to its solidification, the liquid supplement is poured into a container such as cardboard box. The liquid supplement solidifies into a solid in a period of from one to about five hours after its preparation. The resultant product is a very hard, dense block. The hardening of the blocks can be accelerated by holding the blocks at an ambient temperature from 70 to about 95 degrees F. for a time from 1 to about 24 hours.

The following example illustrates the practice of the invention and serves to demonstrate results obtainable therewith.

EXAMPLE 1

An animal feed supplement block is prepared in a laboratory experiment by mixing 69 weight parts water and 23 weight parts calcium oxide (lime). The mixture is stirred for 15 minutes while 5 weight parts of cellulose fibers (unbleached Kraft pulp) are added. Then 786 weight parts of 79.5 Brix molasses (25% water) are added and the mixture is again stirred for 15 minutes.

Urea (65 weight parts) and aqueous phosphoric acid (55 weight parts, 75% concentration) are added and the mixture is stirred for about 5 minutes. The mixture begins to thicken upon the addition of the phosphoric acid and thereafter 63 weight parts magnesium oxide powder (all passing 325 mesh screen) are added. The mixture is stirred for about 5 minutes and then 55 weight parts of yellow grease are added and the mixture is stirred to disperse the fat and is immediately poured into a cardboard box container. The liquid begins to solidify to a solid after about 30 minutes. Inspection of the solid reveals that it is integral and remains intact even after several months of storage. The block is extremely hard and water resistant and can be provided to animals for free choice feeding without any risk of overconsumption.

When the experiment is repeated without addition of the cellulose fibers, cracks begin to appear in the blocks within approximately 24 hours. When the experiment is repeated without the magnesium oxide, a block is produced with a hardness which is usually not sufficient to prevent overconsumption during free choice feeding. Elimination of the calcium oxide ingredient produces a similar result with the additional hinderance that the block requires several weeks to harden into a solid.

The invention has been described with reference to the illustrated and preferred embodiment. It is not intended that the invention be unduly limited by this description of preferred embodiments. Instead, it is intended that the invention be defined by the means, and steps, and their obvious equivalents set forth in the following claims.

What is claimed is:

1. The method of preparing an animal feed supplement from an aqueous sugar solution which consists essentially of the steps of adding a calcium reactant selected from the class consisting of calcium hydroxide and calcium oxide and soluble phosphate reactant selected from the class consisting of ammonium and alkali metal phosphates and phosphoric acid to said solution, each in an amount from 1.0 to 5.0 weight percent, sufficient to cause gelation of said sugar solution, agitating the resultant mixture to disperse the aforesaid reactants, and admixing into the sugar solution, subsequent to the addition of said calcium and phosphate reactants but prior to gelation of the solution into a solid, from 2 about 15 weight percent magnesium oxide, in an amount adequate to increase the hardness of the resultant solid product sufficiently to inhibit its consumption.

2. The method of claim 1 wherein said sugar solution is molasses of a concentration from 60 to 85 Brix.

3. The method of claim 1 wherein said magnesium oxide is finely subdivided with at least 90 weight percent thereof passing a 100 mesh screen.

4. The method of claim 1 wherein said magnesium oxide all passes a 225 mesh screen.

5. The method of claim 1 wherein said magnesium oxide is added at a concentration of from 4 to about 10 weight percent.

6. The method of claim 1 wherein discrete pulped cellulose fibers having lengths from about 1/16 to about 1 inch, are added to said sugar solution prior to its gelation in sufficient quantities to reinforce said solid products and inhibit the formation of cracks therein.

7. The method of claim 6 wherein said cellulose fibers are wood pulp.

8. The method of claim 7 wherein said wood pulp is unbleached kraft process pulp.

9. The method of claim 1 which includes adding from 2 to about 30 weight percent fat to said solution before it solidifies.

10. The method of claim 1 wherein calcium hydroxide is added to said solution.

11. The method of claim 1 wherein calcium oxide is added to said solution.

12. The method of claim 1 wherein phosphoric acid is added to said solution after the addition of said calcium reactant.

13. The method of claim 11 wherein calcium oxide is added to the solution and permitted to hydrate and phosphoric acid is thereafter added when the pH value of the solution has risen by 4 to 5 units.

14. The method of claim 1 including the addition of a nitrogen source to said solution before its solidification to provide from 1 to about 40 weight percent equivalent protein in said supplement.

15. A solid animal feed supplement consisting essentially of molasses, and solidifying ingredients sequentially added thereto as a soluble calcium reactant selected from the class consisting of calcium oxide and calcium hydroxide, in an amount from 1.0 to about 5.0 weight percent, expressed as the oxide and a soluble phosphate or phosphoric acid in an amount from 0.5 to about 5.0 weight percent expressed as P 0, with a proportion of equivalent weights of phosphate to metal from 1.0 to about 4.0, sufficient to react with said calcium reactant and solidify said supplement into solid block form and magnesium oxide added subsequent to commencement of said reaction between said calcium reactant and phosphate or phosphoric acid and prior to solidification of said molasses, in an amount from 2 to about 15 weight percent, sufficient to increase the hardness of said solid product to inhibit its consumption.

16. The supplement of claim 15 wherein said molasses has a concentration from 60 to 85 Brix.

17. The supplement of claim 15 wherein said magnesium oxide is added at a concentration from 4 to about 10 weight percent.

18. The supplement of claim 15 also including discrete pulped cellulose fibers of lengths from 1/16 to about 1 inch present in an amount from 0.1 to about 2.5 weight percent, sufficient to inhibit the formation of cracks in said solid feed supplement.

19. The supplement of claim 15 including from 2 to about 30 weight percent of a feed grade fat.

20. The supplement of claim 19 including from 0.05 to about 1 weight percent of a fat emulsifying agent.

21. The supplement of claim 15 including from 5 to about 40 weight percent equivalent protein derived from an added nonprotein source selected from the class consisting of urea, biuret and ammonium phosphate.

* * * * *